United States Patent [19]
Wu

[11] Patent Number: 5,991,756
[45] Date of Patent: Nov. 23, 1999

[54] INFORMATION RETRIEVAL FROM HIERARCHICAL COMPOUND DOCUMENTS

[75] Inventor: Jiong Wu, Fremont, Calif.

[73] Assignee: Yahoo, Inc., Santa Clara, Calif.

[21] Appl. No.: 08/963,372

[22] Filed: Nov. 3, 1997

[51] Int. Cl.$^6$ .................................................. G06F 17/30
[52] U.S. Cl. .................... 707/3; 707/4; 707/515
[58] Field of Search .................... 707/3, 4, 5, 6, 707/501, 513–515

[56] References Cited

U.S. PATENT DOCUMENTS

| | | | |
|---|---|---|---|
| 5,546,571 | 8/1996 | Shan et al. .............................. | 395/600 |
| 5,628,009 | 5/1997 | Kikuta et al. ........................... | 396/610 |
| 5,694,594 | 12/1997 | Chang ........................................ | 707/6 |
| 5,764,973 | 6/1998 | Lunceford .................................. | 707/1 |
| 5,787,417 | 7/1998 | Hargrove .................................... | 707/4 |
| 5,787,430 | 7/1998 | Doeringer et al. ...................... | 707/100 |
| 5,812,134 | 9/1998 | Pooser et al. ........................... | 345/356 |
| 5,819,258 | 10/1998 | Vaithyanathan et al. .................. | 707/2 |
| 5,835,905 | 11/1998 | Pirolli et al. ............................... | 707/3 |
| 5,855,013 | 12/1998 | Fisk ............................................ | 707/3 |

OTHER PUBLICATIONS

Sullivan et al. "Supercharge Your Web–Searched—Looking for information in all the wrong places? Here are the top tools and tips for getting the most of your web searches" NetGuide, Issue 405, pp. 1–8. May 1997.

"Tips on Popular Search Engines" http://www.hamline.edu/library/handouts pp. 1–5, 1997.

"Yahoo!—Frequently Asked Questions" http://www.yahoo.com pp. 1–8.

Sehami et al. "SONIA: A Service for Organizing Networked Information Automatically" Digital Libraries, 98 pp. 200–209. Mar. 1998.

Lim et al. "Querying Structured Web Resources" Digital Libraries 98, pp. 297–298, Mar. 1998.

Balasubramanian et al. "A Large–Scale Hypermedia Application using Document Management and Web Technologies" Hypertext 97, pp. 1–12, 1997.

Mukherjea et al. "Focus and Context Views of World–Wide Web Nodes" Hypertext '97, pp. 1–10. 1997.

Kustron "Searching the World Wide Web" ARMA Records Management Quarterly, pp. 1–7. Jul. 1997.

Notess "Comparing Net Directories" Database, pp. 1–5. Feb. 1997.

*Primary Examiner*—Paul V. Kulik
*Attorney, Agent, or Firm*—Philip H. Albert; Townsend and Townsend and Crew LLP

[57] ABSTRACT

A search query is applied to documents in a document repository wherein the documents are organized into a hierarchy. A search engine searches the hierarchy to return documents which match a query term either directly or indirectly. A specific embodiment of the search engine organizes the query term into individual subterms and matches the subterms against documents, returning only those documents which indirectly match the entire search query term and directly match at least one of the query subterms.

7 Claims, 7 Drawing Sheets

INFORMATION RETRIEVAL FROM HIERARCHICAL COMPOUND DOCUMENTS

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to the field of electronic document storage and management. More specifically, one embodiment of the invention provides for a system of storing compound documents and searching the stored compound documents.

Information has recently undergone a transition from a scarce commodity to an overabundant commodity. With a scarce commodity, efforts are centered on acquiring the commodity, whereas with an overabundant commodity, efforts are centered on filtering the commodity to make it more valuable. The prime example of this phenomenon is the explosion of information resulting from the growth of the global internetwork of networks known as the "Internet." Networks and computers connected to the Internet pass data using the TCP/IP (Transport Control Protocol/Internet Protocol) for reliably passing data packets from a source node to a destination node. A variety of higher level protocols are used on top of TCP/IP to transport objects of digital data, the particular protocol depending on the nature of the objects. For example, e-mail is transported using the Simple Mail Transport Protocol (SMTP) and the Post Office Protocol 3 (POP3), while files are transported using the File Transfer Protocol (FTP). Hypertext documents and their associated effects are transported using the Hypertext Transport Protocol (HTTP).

When many hypertext documents are linked to other hypertext documents, they collectively form a "web" structure, which led to the name "World Wide Web" (often shortened to "WWW" or "the Web") for the collection of hypertext documents that can be transported using HTTP. Of course, hyperlinks are not required in a document for it to be transported using HTTP. In fact, any object can be transported using HTTP, so long as it conforms to the requirements of HTTP.

In a typical use of HTTP, a browser sends a uniform resource locator (URL) to a Web server and the Web server returns a Hypertext Markup Language (HTML) document for the browser to display. The browser is one example of an HTTP client and is so named because it displays the returned hypertext document and allows the user an opportunity to select and display other hypertext documents referenced in the returned document. The Web server is an Internet node which returns hypertext documents requested by HTTP clients.

Some Web servers, in addition to serving static documents, can return dynamic documents. A static document is a document which exists on a Web server before a request for the document is made and for which the Web server merely sends out the static document upon request. A static page URL is typically in the form of "host.subdomain.domain.TLD/path/file" or the like. That static page URL refers to a document named "file" which is found on the path "/path/" on the machine which has the domain name "host.subdomain.domain.TLD". An actual domain "www.yahoo.com", refers to the machine (or machines) designated "www" at the domain "yahoo" in the ".com" top-level domain (TLD). By contrast, a dynamic document is a document which is generated by the Web server when it receives a particular URL which the server identifies as a request for a dynamic document.

Many Web servers operate "Web sites" which offer a collection of linked hypertext documents controlled by a single person or entity. Since the Web site is controlled by a single person or entity, the hypertext documents, often called "Web pages" in this context, have a consistent look and subject matter. Especially in the case of Web sites put up by commercial interests selling goods and services, the hyperlinked documents which form a Web site will have few, if any, links to pages not controlled by the interest. The terms "Web site" and "Web page" are often used interchangeably, but herein a "Web page" refers to a single hypertext document which forms part of a Web site and "Web site" refers to a collection of one or more Web pages which are controlled (i.e., modifiable) by a single entity or group of entities working in concert to present a site on a particular topic.

With all the many sites and pages that the many millions of Internet users might make available through their Web servers, it is often difficult to find a particular page or determine where to find information on a particular topic. There is no "official" listing of what is available, because anyone can place anything on their Web server and need not report it to an official agency and the Web changes so quickly. In the absence of an official "table of contents", several approaches to indexing the Web have been proposed.

One approach is to index all of the Web documents found everywhere. While this approach is useful to find a document on a rarely discussed topic or a reference to a person with an uncommon first or last name, it often leads to excessive numbers of "hits." Another approach is to summarize and categorize web documents and make the summaries searchable by category.

In either case, a typical search engine searches for search terms in each candidate document and returns a list of the documents which meet the search criteria. Unfortunately, the information to be gained from the interrelationships of documents is lost. From the above it is seen that an improved search system which takes into account the interrelationships between documents is needed.

SUMMARY OF THE INVENTION

An improved search system which takes into account interrelationships among documents by searching across links is provided by virtue of the present invention. In one embodiment of the present invention, the documents are references in a hierarchical document repository used for keyword and topical searches. A search query is applied to the hierarchy, which returns documents which directly match a search query term or indirectly match the search query term by being a child document in the hierarchy from a parent document matching all or part of the query term. In a preferred embodiment, a returned document matches at least one subterm of the query term directly.

One advantage of the present invention is that it provides for efficient storage of hierarchical data while allowing searches to be performed taking into account relationships among data elements in a hierarchy.

A further understanding of the nature and advantages of the inventions herein may be realized by reference to the remaining portions of the specification and the attached drawings.

BRIEF DESCRIPTION OF THE DRAWINGS

FIG. 5 is a screen shot of a browser display of search results according to one embodiment of the present invention.

DESCRIPTION OF THE PREFERRED EMBODIMENTS

Figure 1:
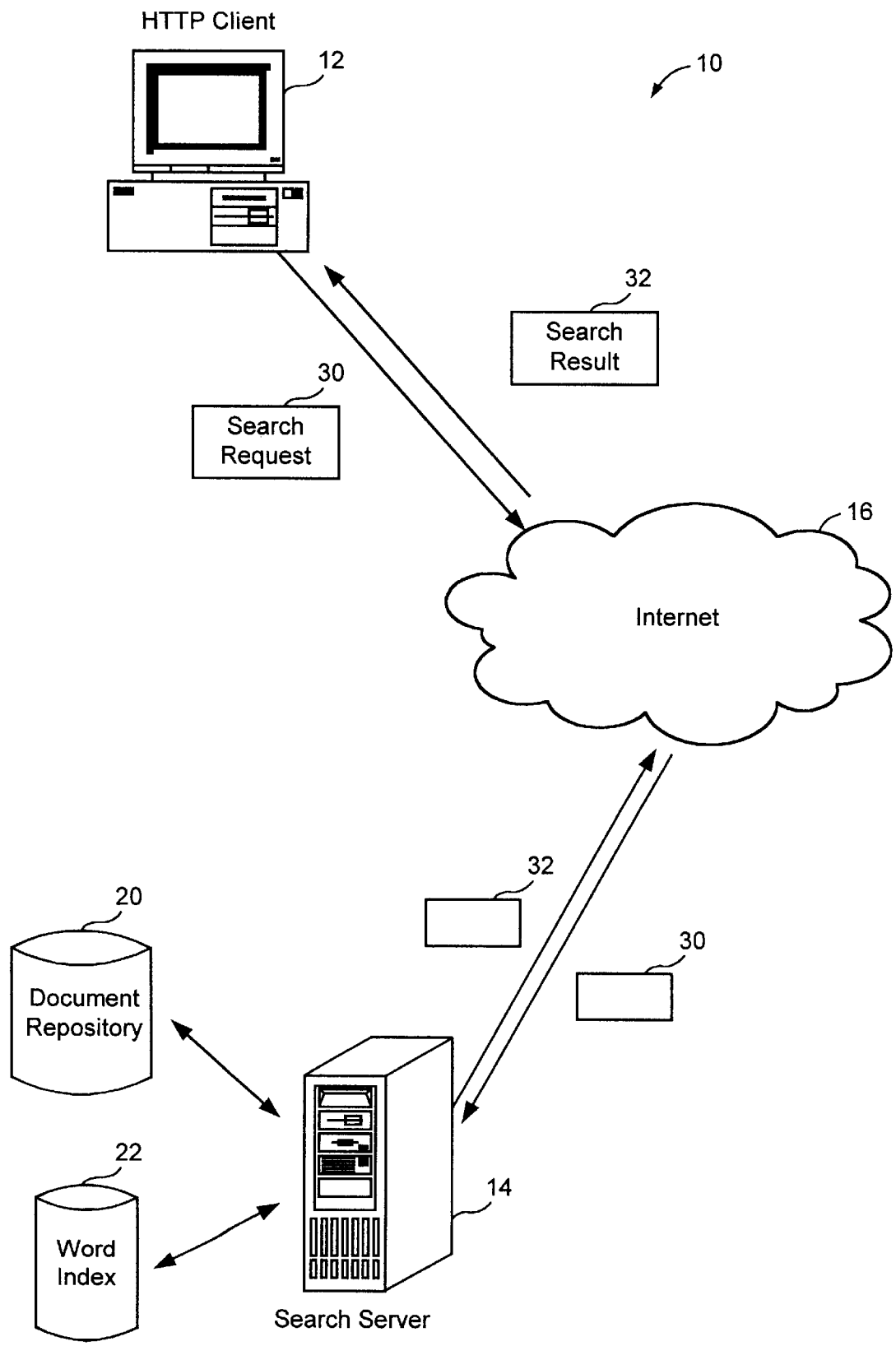
FIG. 1 is a schematic diagram of a client-server system having a search engine according to one embodiment of the present invention.

The present invention relates to an apparatus for searching for selected documents in a document repository containing a large number of documents. A search engine according to one embodiment of the present invention receives a search expression and, based on that search expression, searches for matching documents in the document repository and returns either the matching documents or a list of references to each of the matching documents. Where the search expression is a complex logical function of two or more subterms, the search engine will return documents which match some of the subterms only indirectly. For example, the search expression may be an "AND" of three subterms. Instead of only returning documents containing all three subterms, the search engine will also return documents which only have one or two of the subterms, if the remaining subterms are found anywhere in documents along the hierarchical path from the document to a root node. In some variations, documents with only indirect matches for all of the subterms are returned, but in the preferred embodiment, a returned document must match directly at least one subterm.

The present invention is described herein with reference to a particular type of document, however it should be understood that the present invention and the embodiments described herein are usable with many other types of documents.

The documents described in the main example herein are records in a search database. The search database is organized as a hierarchical structure of categories and site references. The structure might be automatically generated, but in the embodiment known as the Yahoo! search database, the categories and site references are placed in appropriate locations in the hierarchy by an editorial staff using the experience and suggestions from site submitters.

The categories and site references are collectively referred to as the nodes of the structure. Some category nodes are parent nodes, in that they point to other category nodes (child nodes) representing more specific subcategories of the category represented by the parent node. Site nodes are child nodes from a category node (although a particular site might be listed in multiple categories and be a child node in several subtrees).

Herein, a node might be described as being a parent, child, ancestor or descendant node of another node. Relative to a node N, a parent node is the node one level above node N in the hierarchy, N's child nodes are nodes one level below node N in the hierarchy, N's ancestor nodes are nodes at any level above node N, and N's descendant nodes are nodes at any level below node N. Typically, the hierarchy has a root node which has no ancestor nodes and has all other nodes as descendant nodes.

In the embodiment described here, a category node can have category nodes, site nodes or both as child nodes, but site nodes do not have child nodes. Some category nodes might have no child nodes, but such empty categories are preferably deleted or hidden. Also, not all category nodes are required to have child nodes, but preferably empty categories are deleted or hidden to avoid unnecessary clutter.

FIG. 1 shows an example of a client-server system 10 in which such a search database is queried. System 10 is shown comprising an HTTP client 12 connected to a search server 14 via Internet 16. Search server 14 is coupled to a document repository 20 and a word index 22 and responds to a search request 30 with a search result 32.

In this specific example, HTTP client 12 is a browser, but other HTTP clients, such as search back-end processors, could be used instead of a browser. Also, it should be understood that system 10 could be implemented with Internet 16 replaced with an alternate communications channel between HTTP client 12 and search server 14. Furthermore, it should be understood that while search server 14 is an HTTP server, it could handle requests using an entirely different protocol, so long as the different protocol is understood by HTTP client 12 or its substitute. For brevity, only one HTTP client, one request and one response is shown, but it should be understood that, in practice, many clients will be accessing search server 14 substantially simultaneously, each with one or more search requests. In fact, if warranted, the tasks of search server 14 might be spread over multiple machines. If the tasks are spread over multiple machines, the preferred arrangement is to have the multiple machines presented to the clients as a single logical machine, to simplify client access.

In operation, a user at a browser, or other HTTP client, sends a request 30 containing a search expression to search server 14 where search server 14 parses the search expression and, if the search expression is in a valid format, uses the search expression to find documents in document repository 20 which match the search expression. Search server 14 responds with either a list of matching documents or the documents themselves. Word index 22 is used to speed up the search for documents in document repository 20.

Figure 2:
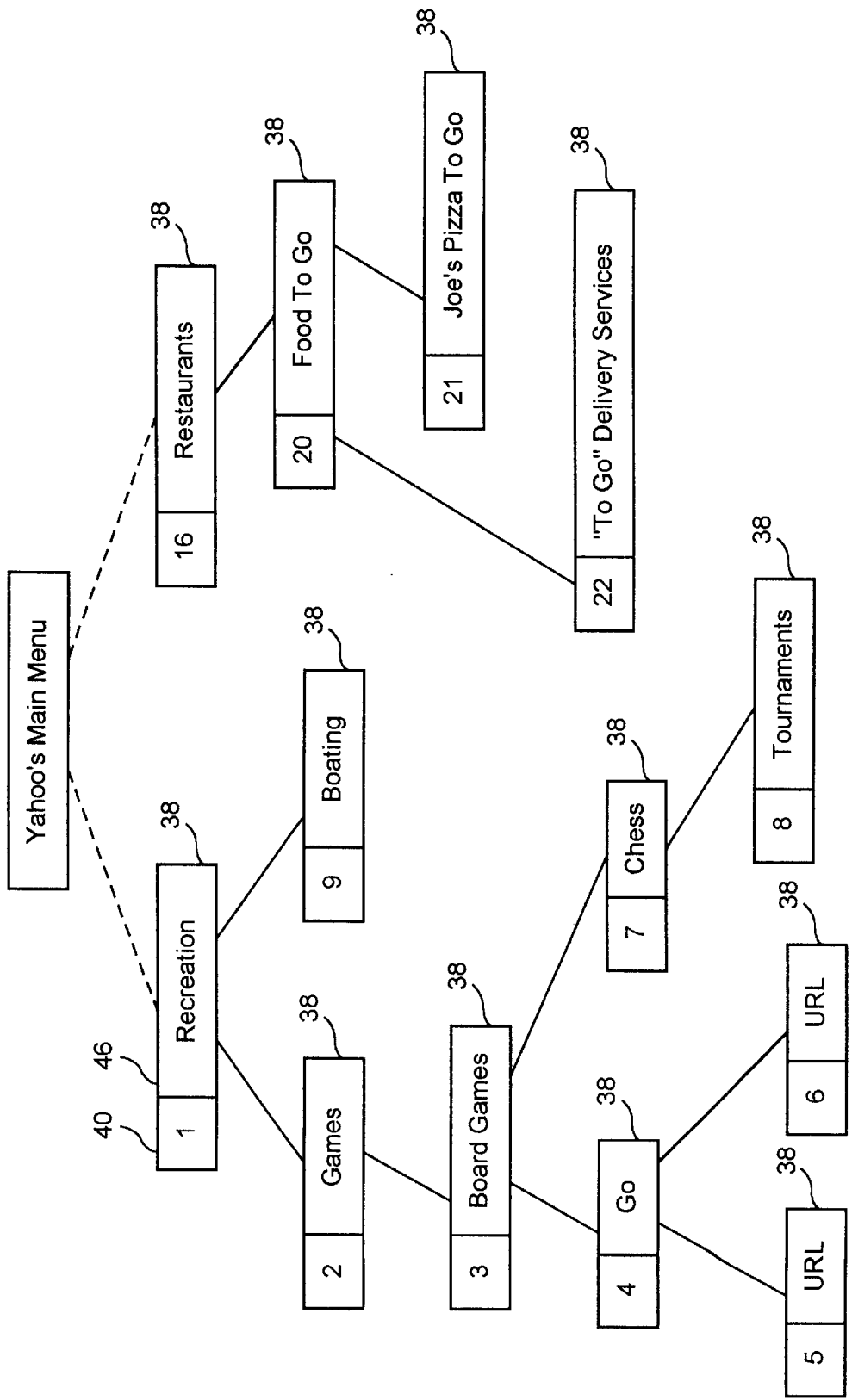
FIG. 2 is a tree graph of documents corresponding to parts of the document repository.

FIG. 2 shows how the documents in document repository 20 are logically arranged. In this example, documents are elements of a search database which is used to locate WWW sites of interest. Each document represents a topical category or a site and each document is shown as a record 38 in a hierarchical structure being in parent or child relation with other records. Each record 38 is shown with a document number 40 and content 46. In the case of a document which is a category, content 46 is the title of the category and other text (not shown), such as hidden keywords, synonyms, descriptions, etc., while the content of documents which refer to sites includes a title, a URL, a description, hidden keywords, synonyms, etc. Of course, some of these elements can be blank, where appropriate or desired. As explained above, in the Yahoo! search database, the documents are positioned in the hierarchical structure by an editorial staff. In a typical procedure, a site promoter will submit site information to the editorial staff, such as a site title, site URL, proposed location in the hierarchy, description, etc. The editorial staff then evaluates the submission, changing the suggested location if a more appropriate location exists, cross links as needed, and adds, in some cases, hidden keywords, synonyms and/or a document importance weighting value.

Links between records are shown in FIG. 2, with each link connecting a more general topic (parent node) with a more specific topic or a site reference (child node). For example, document #5 is a site reference to a WWW site relating to "Go", which is a board game and therefore a subtopic of the "Board Games" topic, which is a subtopic of the "Games" topic, which is a subtopic of the "Recreation" topic, and so on.

While some site references, such as documents #5 and #6, are nodes off of a leaf category (i.e., one with no child category nodes), other documents, such as document #21, is a node off of a nonleaf category. Collectively, the links define trees and subtrees which, as explained below, are numbered so that the documents in any subtree are consecutively numbered following the document number of the document at the top of the subtree.

Figure 3:
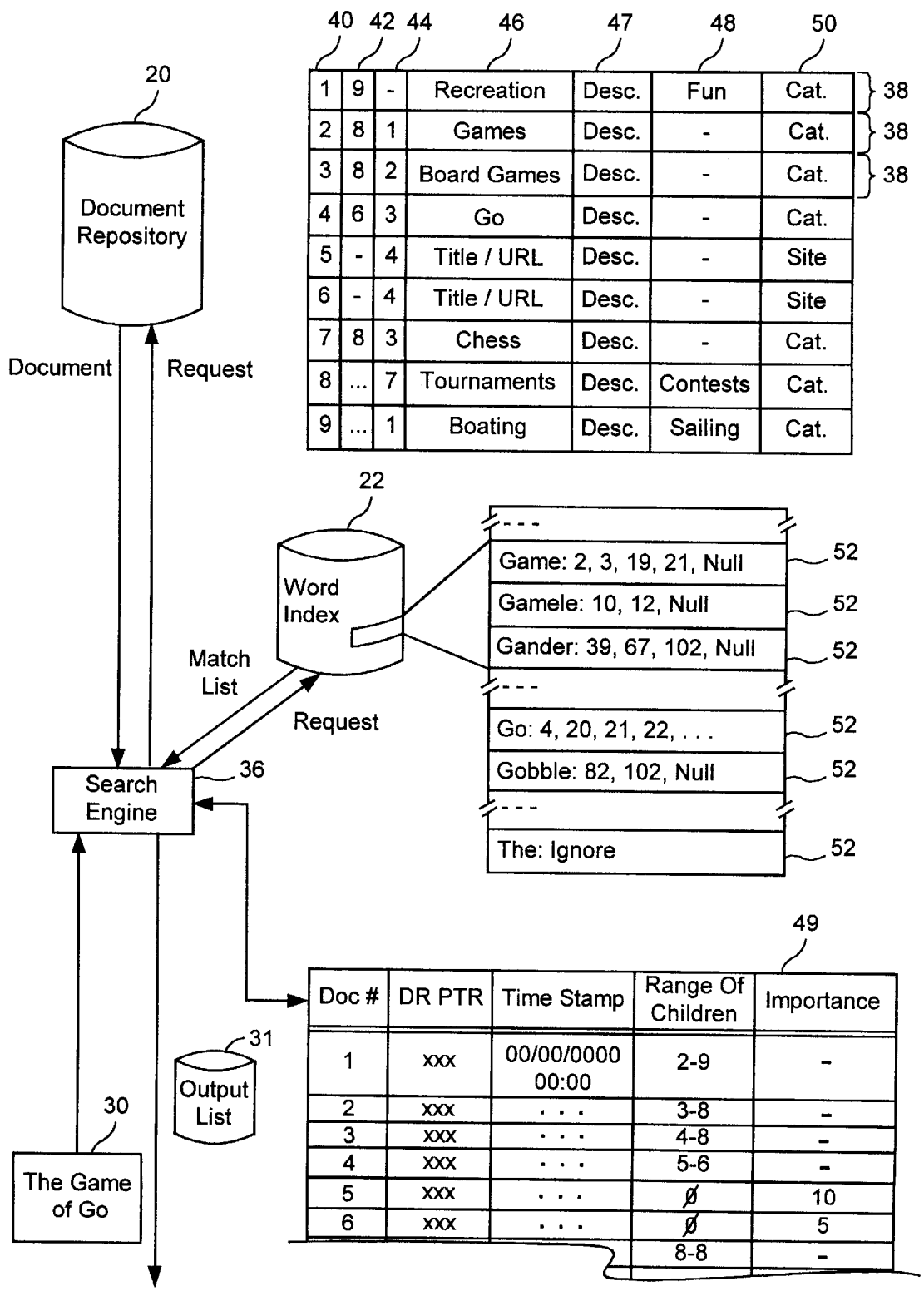
FIG. 3 is a more detailed view of elements of the client-server system shown in FIG. 1, showing further details of a document repository, a word index and a search engine.

Referring now to FIG. 3, a different view of the information shown in FIG. 2 is presented. FIG. 3 presents the information as it is likely to be stored, with records 38 in a data table corresponding to nodes of the tree structure in FIG. 2. It should be understood that the data structures of FIG. 3 represent one of many possible data arrangements. Only a few records 38 are shown, but in practice many millions of records might be present.

The fields shown for records 38 are a document number 40, a subtree pointer 42 to a last node in a subtree (which can either be stored, generated on the fly as needed or obtained from a memory array), a parent pointer 44 to a parent node, the text of the document represented by the record (shown here as a title 46 and a description 47), an optional set 48 of one or more keywords associated with the document, and a boolean indication 50 of whether a record is for a category or a site. As with the view of FIG. 2, some nodes point to WWW sites and other nodes represent categories in a hierarchical topical category structure in which site elements are associated with one or more category elements. It should be apparent from this description, that while the example is a tree structure of topics and site references, the system described herein can search more complex documents.

For category nodes, record 38 includes a title 46, a description 47 of the category, and possibly a set of hidden keywords 48. For site nodes, the record includes a title, a description of the cite (possibly blank), and a URL pointing to the site/page referenced. Together, document number 40, subtree pointer 42 and parent pointer 44 describe the linkage between records. For example, document #2 has "8" as its subtree pointer, indicating that all the documents numbered from 3 (the document number plus one) to 8 (the subtree pointer value) are in the subtree below document 2, and "1" as its parent pointer, indicating that document 1 is the parent document of document 2. The other fields of the record 38 for document #2 indicate that its content is "Games", it has no keywords listed and it is a category (as opposed to a site reference). The specification of an entire subtree using just the last document number in the subtree is possible because of the particular assignment order of document numbers.

Document repository 20 includes the necessary processing logic to return documents requested by document number and either document repository 20 or search engine 36 contains processing logic to search a record for an instance of a field value which matches a query term.

Referring now to word index 22 shown in FIG. 3, a small subset of the contents of word index 22 is there shown. Word index 22 is organized as a plurality of records, with one record per word occurring in the documents of document repository 20, sorted in alphabetical order by word. Each record 52 in word index 22 is shown with a tag identifying the word, followed by a list of document numbers. These document numbers represent the list of documents containing the word. Where a word is so common as to be a search term of limited usefulness, such as the word "the", its record does not list all of the documents containing the word, but just an indication that the word should be ignored.

In the preferred embodiment, search engine 36 uses a document profile array 49 to improve search speed. Typically, array 49 is stored in memory for quick access. Array 49 has one record per document and each record includes fields for a document number, a document repository pointer, a time stamp, a child record range and an importance weighting value. The document numbers correspond to document numbers of document repository 20 and the document repository pointers correspond to physical disk locations of the documents in document repository 20, so that array 49 can be used to perform some operations on documents which don't require an access of document repository 20 itself. The time stamp identifies the time that the document was last modified. The range of children field indicates which records are below the instant document in the hierarchy, so that search engine 36 can quickly build a match list without having to refer to document repository 20 too often.

The importance weighting value is a value set automatically, or by an editorial staff, to indicate how valuable and/or relevant a particular category or site is relative to other categories and sites. The importance weighting value of a record might be adjusted based on external events or the significance of a site. For example, a site related to a particular group which is currently in the news might be given a higher weighting, or a site might be given a higher weighting if the editorial staff determines that the site is a popular or well-designed. Although the category records in array 49 shown in FIG. 3 do not have weighted categories, weighted categories might be useful. For example, during boating season, the weighting for document #9 (category "boating"), might be increased. A record's weighting comes into play when multiple documents are being displayed as a search result, as the display documents are display in order by their weighting values. Of course, other weighting factors, as described below, might override the importance weighting or be combined with it to form an overall weighting.

The use of document repository 20 and word index 22 will now be described with reference to an example. In this example, a user is searching for documents and presents a search request with a query string "The game of Go". Search engine 36 looks up each of the terms in word index 22. Because they are so common, "the" and "of" are either ignored by search engine 36 or word index 22 returns instructions to ignore those words, as described above. Search engine 38 then reads the document lists for "game" and "go", generates a match list for each term and applies an "AND" operator to the match lists as described below in connection with FIG. 6.

A match list is a list of all the documents that contain the list's match tag either directly or indirectly. A match tag is a word or other search term or search element, depending on what the query term is. FIG. 2 illustrates why indirect matches are important. The example used throughout this description is a search for categories and sites related to the game of "Go", a well-known board game using black and white markers. Since the name of the game happens to be the same as a common word in the English language, searching for "go" would result in too many unrelated matches. However, as can be seen, searching for "go" and "game" in the same document would result in no matches. Therefore, each document needs to be searched as if it contained all of the searchable elements (the searchable elements are words in this case) of all of its ancestor documents. Of course, the content of all ancestor documents can be inserted into each of the descendant documents in its subtree, but with large trees, this approach is wasteful and impractical.

Figure 4:
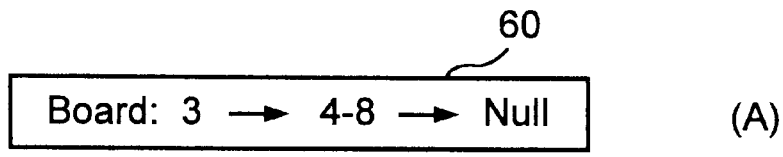
FIGS. 4(a)-(c) are examples of match lists used by the search engine shown in FIG. 3.
Figure 4:
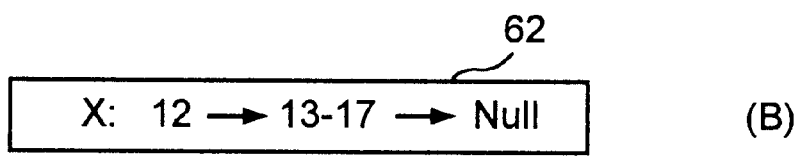
Figure 4:
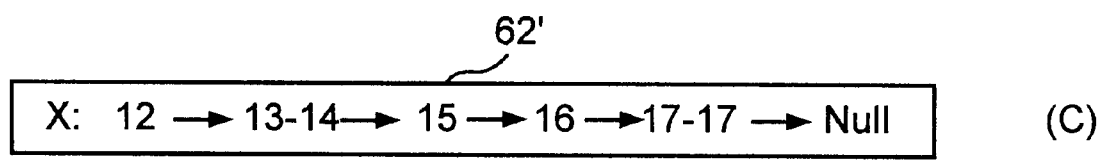

Referring again to FIGS. 2–3, each item on a match list refers to single document, in the case of a direct match, or a range of documents, in the case of an indirect match. FIG. 4 shows several examples of match lists. The first, FIG. 4(a) is a match list 60 which corresponds to the particular documents shown in FIGS. 2–3. Match list 60 contains three items, or match records. The first is a direct match record indicating that document #3 matches the match tag and the second is an indirect match record indicating that documents #4 through #8 indirectly match the match tag.

In this example, since the match tags are text, "matching" occurs when the document contains the match tag as a string or substring in the document's content. In some cases, the only form of substrings which are recognized are "right hand wildcard" substrings, which are of the form of "word*". As can be seen from FIGS. 2–3, document #3 does indeed directly match the match tag, "board", of match list 60. Documents #4 through #8 do not contain the word "board" directly, but they are child documents/nodes from a document/node which does contain the word. Because they are children from a parent which contains the word and the children do not contain the word, they are therefore indirect matches.

Match list 60 has a third match record, "null", which simply indicates the end of the match list. The use of a null item at the end of a list is a well-known computing technique and many other list handling techniques can be used in place of the particular one described here.

The direct match records in a match list come from word index 22. The indirect match records are obtained by examining the document record in document repository 20 or a document summary record in array 49 for each direct match. If a direct match document record indicates that the document has a subtree, an indirect match record is created for the document range in the subtree. Where a document in the subtree is also a direct match, it is excluded from the indirect match range (which may result in a range being split over two indirect match records). As each direct match is added to a match list, the match list is checked to determine if an indirect match (a range) already on the match list overlaps the direct match. This occurs where the match term appears in both an ancestor document and a descendant document. Because ancestor documents have lower document numbers than their descendants, the ancestor document is processed first. A direct match record is created for the ancestor document and then an indirect match record is created for the group of descendant documents below the direct match document. When the descendant direct match document is processed, it too will be listed in a direct match record, and therefore should not be included in the range of an indirect match. To keep each indirect march associated with only one range of documents, the indirect match record is split into two indirect match records, one on each side of, and excluding, the descendant direct match document. Of course, if the descendant document is at one border of the indirect range, only one new indirect match record will be created. That one new indirect match record would simply be the indirect range reduced by one document number at the border.

This is illustrated in FIGS. 4(b)–(c). A match record 62, shown in FIG. 4(b), has a direct match record for document 12 and an indirect match record for documents #13 to #17. If documents #15 and #16 were changed such that they contained the match tag directly, the subtree would be represented by two indirect matches, one on each side of the direct match. Of course, if there were no matches on one side of the direct match, only one indirect match record would be necessary.

It should be noted that one of the document ranges, "17—17", contains only one document. This is to distinguish indirect match records from direct match records. Of course, alternatives arrangements can be used. For example, in a simple case, each match record could comprise just a flag and a document number, where the flag indicates whether the document number refers to a direct or indirect match. For direct matches, the single number would be the number of the matching document and for indirect matches, the number is the number of the last document of the range. This is not ambiguous where the first number of the range is the number following the number of the immediately preceding direct match record. This will be the case unless document numbers are missing, because the documents were ordered so as to have this property.

Referring back to FIG. 3, in some systems, depending on how often documents are changed and how often search terms are used, both direct matches and indirect matches might be precalculated and stored in records 52. Otherwise, they are created on the fly as needed. If that is done, search engine 36 need not access document repository 20 unless a search query requires an examination of the position of words in the documents or other field information which cannot be obtained from word index 22. An advantage of using word index 22 is that the match tags are in order for quick searching given a search request.

Once a match list is obtained or generated by search engine 36, it returns an output list 31. Output list 31 can be the listed documents themselves, or just the document numbers. If output list 31 is the documents themselves, and it is appropriately formatted, output list 31 might be the search result 32 which is sent to browser 12 (see FIG. 1).

Figure 5:
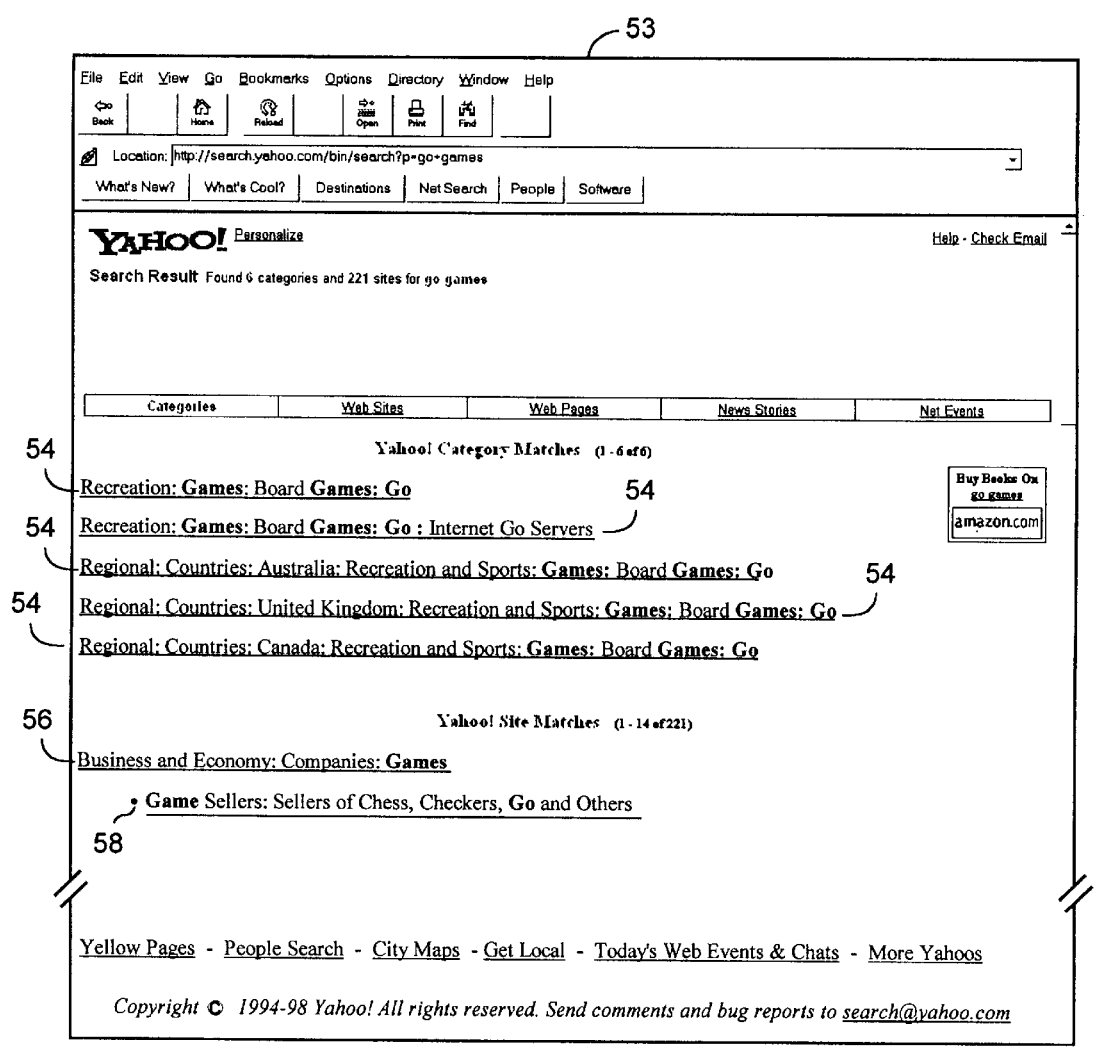

FIG. 5 shows an example of a display 53 of a search result which might result from the query string: "The game of go". On display 53, matching category documents 54 are shown above, and separated from, matching site documents 58, shown with their paths 56 through the category tree. FIG. 5 represents an actual search through the category structure and site listings of Yahoo!, Inc., the assignee of the present application. For clarity, not all the matches shown in FIG. 5 are represented in other figures and not all of the actual 177 site matches found are shown in FIG. 5.

Several ease-of-use features of display 53 should be noted. Each of the "hits" or matches (54, 58) are shown with a concatenation of titles of categories defining a path to the match. This provides the user with context. Examples of this are shown by matching category documents 54 shown in FIG. 5. To further improve readability, matching documents which are children nodes from a matching document are not shown. If they were, all of the records under matching category documents 54 would have been shown.

Now that match lists, with direct and indirect match records, and their generation have been described, the application of operations, such as "AND", "OR", "ADD" and "SUBTRACT" on match lists to form other match lists will now be described. These operations are useful where a search engine needs to generate a match list for a complex search expression which contains a plurality of search subterms where a match list is available for each of the search subterms. Continuing the example described above, the search engine might combine the match lists for the search terms "go" and "game" using an AND operator to arrive at a match list (or document list) for the search expression "go AND game".

Figure 6:
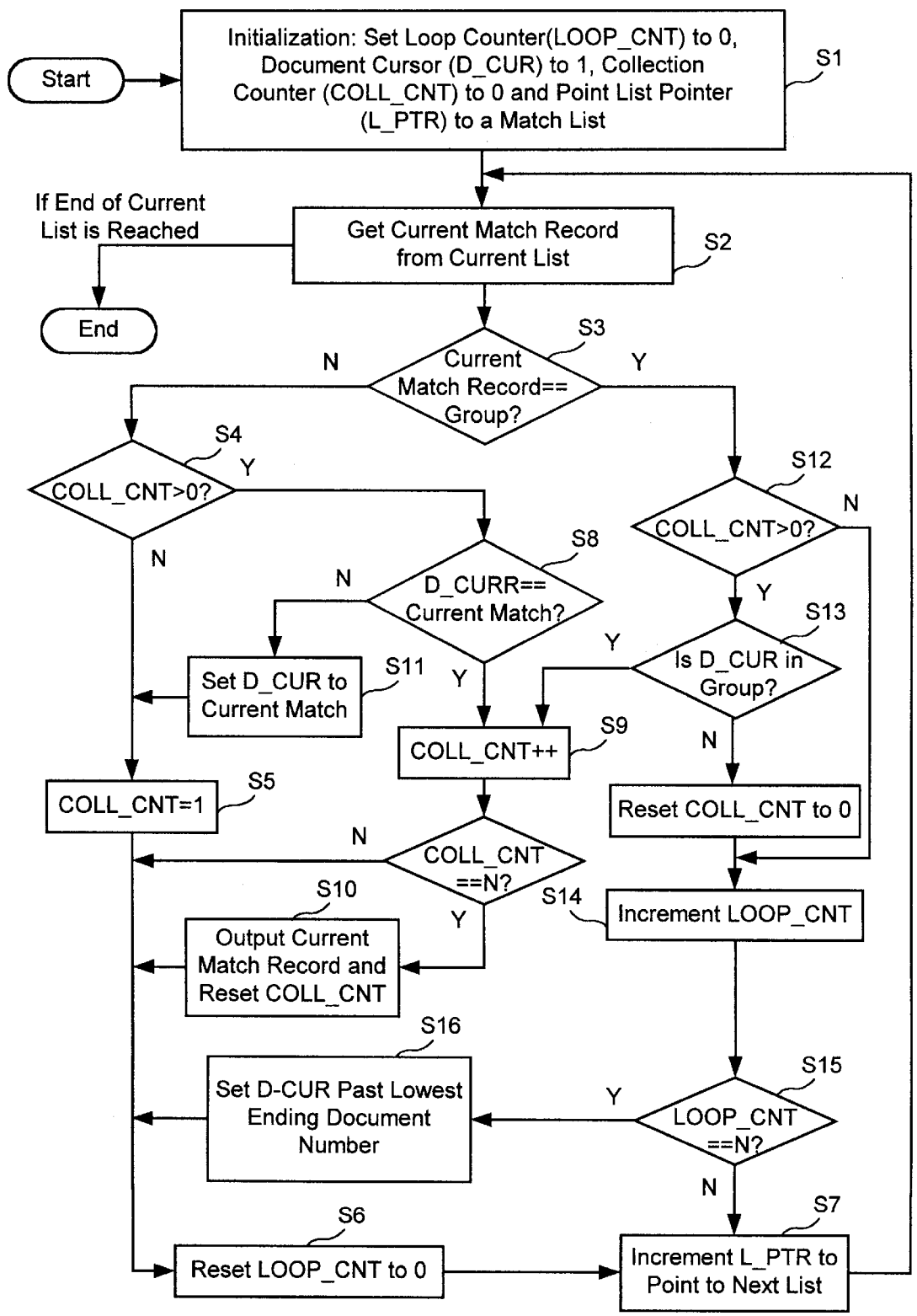
FIG. 6 is a flow chart of an AND operation performed by a search engine.

FIG. 6 is a flow chart of a process of "AND"ing two or more match lists to generate a new match list. As will be apparent, the resulting match list can then be used to generate search results or can be used as an input to subsequent logical operations on match lists. If subsequent logical operations are not going to be done, the output could simply be a list of documents. In FIG. 6, the steps are labeled S1, S2, and so on, generally representing the order of execution of the steps. As will be apparent from reading this description, other arrangements of the steps may perform substantially the same function to achieve substantially the same results.

The need for "AND"ing two or more match lists might come about where a search string contains an expression of the form "expression_A AND expression_B AND . . . ". One match list is obtained for "expression_A" indicating the documents that contain that subterm, another for "expression_B", and so on. The resulting match list is a list of all the documents which contain all of the "AND"ed expressions and directly contain at least one of the search subterms. It should be apparent that other variations of these requirements can be handled by modifications of this process which should be apparent after reading this description.

In broad terms, the process described in FIG. 6 is an efficient process for scanning a plurality of match lists to find which documents are found in all of the match lists and found in at least one direct match record. To do this, the process involves first locating a direct match record in one match list and then checking all other match lists to determine if the document is found on those lists. When one match list is found not to have the document on it, a document cursor is incremented to the next document in the match list.

Referring again to FIG. 6, process variables are initialized at step S1. A loop counter, LOOP_CNT, is initialized to zero. The use of the loop counter is explained below. In addition, a document cursor (D_CUR) which points to documents in the match lists, is set equal to one, a collection counter (COLL_CNT) which counts the number of matches found, is set to zero, and a list pointer (L_PTR) which points to one of the match lists, is set to point to one of the match lists. L_PTR may, but need not, be pointed to the match list for the first listed subterm being "AND"ed. The match list pointed to by L_PTR is referred to herein as the "current match list" or the "current list".

At step S2, the current match record is obtained from the current list. This is referred to herein as the "current match record". The current match record is the match record in the current list which has the lowest document number greater than or equal to D_CUR. If the current match list is empty, the process simply ends, because no documents will be found. The first time through step S2, D_CUR will be 1, so the current match record will be the first record in the current match list.

In step S3, the current match record is checked to determine if it is a direct match or a group match. As should be apparent from the description of FIG. 4, it is a simple matter to determine if a match record is a direct match or not, because indirect, or group, matches are expressed as ranges of one or more document numbers. If the current match record is a direct match, that satisfies the requirement that there be at least one direct match for the document represented by the current match record. Prior to the first direct match being found, COLL_CNT is zero, indicating that the process has not yet begun "collecting" a document from the match lists. If COLL_CNT is zero at step S4 and a direct match record is found, COLL_CNT is set to 1 (S5) to indicate that a direct match has been found.

Once the first direct match is found, LOOP_CNT is reset to zero at step S6 (LOOP_CNT is used to prevent infinite loops which might otherwise occur in some situations; its use is explained below), L_PTR is rotated to point to a next match list (S7). Following that, the process loops back to step S2 with the next match list being the current match list. At step S2, a current match record is found in the now current match list. As described above, the record found is the one with the lowest document number equal or greater than D_CUR and if none is found, the process terminates.

If COLL_CNT is nonzero at S4, indicating a state of document collection, D_CUR is checked (S8) against the document number of the current match record. If they are the same, that indicates that the document being collected from the prior match list is the same as for the now current match list. If that is the case, COLL_CNT is incremented (S9) to indicate that another match has been found. If less than all of the N match lists have been processed, COLL_CNT will be less than N, so the process continues at steps S6/S7 where the next match list is made the current match list. This may continue until COLL_CNT is equal to N.

When COLL_CNT reaches N, it means that the document number equal to D_CUR was found in all N of the match lists and therefore is a document number which should be in the output match list. Consequently, the current match record is output (S10) and the process continues at steps S6/S7 (although the process could also continue by looping back to step S2 without changing the current match list). At step S10, COLL_CNT is reset to zero for the next cycle of document number searching.

If, at step S8, the document number of the current match record is not equal to D_CUR, it is because the current match list did not have a match record with a document number equal to D_CUR and a greater document number was chosen. In that case, a current document is still being collected, but it is the new, greater document number. D_CUR is set to that new document number (S11). To keep track of how many match lists have this new document number, COLL_CNT is reset to one (S5) and the process continues as described above.

If, at step S3, the current match record is a group match instead of a direct match, the processing of the record depends on the state of the process, i.e., whether or not a document is being "collected". This is determined by checking COLL_CNT (S12). If COLL_CNT is nonzero, a document is being collected, in which case the current match record is compared to D_CUR (S13). If D_CUR is within the range of the current match record (which must be a group record to get to this step), then COLL_CNT is incremented (S9) and the next list is checked, as described above.

If, at step S12, COLL_CNT is zero, the process continues at step S14. Also, if at step S13, D_CUR is not within the range of the match record, the process continues at step S14 after setting COLL_CNT to zero, to indicate that no document is being collected. At step S14, LOOP_CNT is incremented and compared to N (S15). If LOOP_CNT is not equal to N, the process continues with the next list at step S7. If LOOP_CNT is equal to N, it is an indication that all N lists were examined and a match was found in each, but none of the matches were direct matches; otherwise COLL_CNT would be nonzero.

If LOOP_CNT is equal to N, it means that a group (indirect) match record enclosing D_CUR was found in each of the match lists and therefore no direct match is present for D_CUR. Each of the groups enclosing D_CUR is examined to find the group with the lowest ending document number. Alternatively, the search engine might just keep track of the lowest ending document number as each matchlist is examined. D_CUR is set to one greater than the lowest ending document number (S16) and the search for documents continues at step S6, where LOOP_CNT is set to zero. Step S6 is positioned to reset LOOP_CNT when a direct match is found, an output record is output or LOOP_CNT reaches N and an infinite loop is avoided by moving D_CUR past the end of a current group. In the preferred embodiment, at least one direct match is required. However, in an embodiment where a direct match is not required, the process might output a match record when LOOP_CNT reaches N.

Following this process to its conclusion, when the end of a current match list is reached when passing through step S2, the match records for documents meeting the requirements of the AND operation would have been output in the passes through step S10. Alternatively, if no further logical operations are to be done, the output could just be a listing of the document numbers of matching documents.

Figure 7:
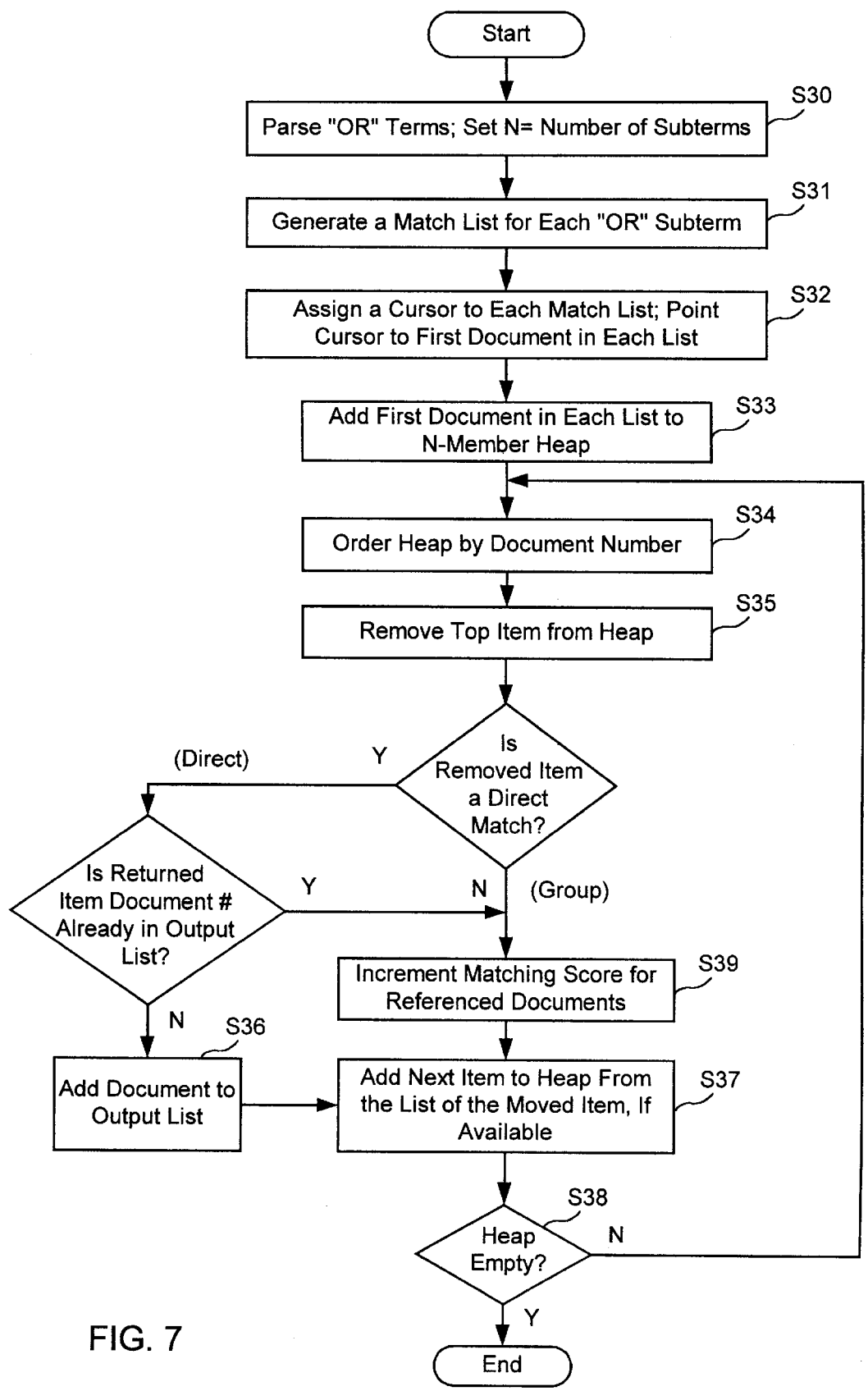
FIG. 7 is a flow chart of an OR operation performed by a search engine.

Referring now to FIG. 7, a process for generating an output list of documents which match a search expression of the form "A OR B OR . . . " from the match lists for the subterms A, B, etc., is there shown. In broad terms, this process involves parsing the search expression into its subterms and identifying a match list for each subterm, then combining the match lists into an output list where each document on the output list contains at least one of the subterms.

In the preferred embodiment, an additional requirement is imposed that each document on the output list have at least one direct match, so there will be no indirect matches, as a document meeting the additional requirement will necessarily directly match the OR expression. In the preferred embodiment, the output list is a list of direct matches each having an associated match count. A match count indicates how many of the OR subterms are matched, directly or indirectly, and therefore is an indication of relative relevance of a particular document.

In the flow chart of FIG. 7, the steps of the process are labelled S30, S31, etc., and are executed in numerical order except where indicated. The process begins at step S30, where the subterms are extracted from the search expression and the match list counter, N, is set equal to the number of subterms. At step S31, one match list is generated for each subterm, or the lists are retrieved if they are preexisting lists.

At step S32, one cursor is initialized for each match list with the cursor pointing to the first document in its associated list. At step S33, the first document from each list is added to an N-member heap.

Next, the heap contents are ordered by document number (S34). In the preferred embodiment, where the heap contains a direct match for a particular document number and an indirect match with a range beginning at that same document number, the direct matches are ordered before the indirect matches. If the heap has more than one indirect match with the same starting document number, they are sorted by their ending document number.

Once the heap is sorted, the top heap item is removed from the heap (S35). If the top heap item is a direct match item and the document number of that direct match item is not already in the output list, it is added to the output list (S36) and the process continues by adding another item to the heap from the match list of the just removed item (S37). If the match list has no more items, no new item is added to the heap. Eventually, the heap will empty out. If at step S38, the heap is empty the process is done and terminates. Otherwise, the process loops back to step S34, where the heap is again ordered.

If the removed item is a direct match record with a document number of a document already on the output list, a match count for that document number is incremented (S39) and the process continues at step S34, as described above. If the removed item is an indirect match record, it is not placed on the output list, but the match count is incremented (S39) for each document which is within the document range of the indirect match record and the process continues at step S34. The indirect match is not added to the output list, because any documents in the document range for that indirect match which meet the requirement of having at least one direct match will already be on the output list. This is because match records are taken from their match list in order when they are placed on the heap and the items on the heap are also taken off in order, and direct matches are taken before indirect matches which start at the same number.

When the heap is empty, the output list will contain all of the documents which match the OR criteria. All of the output list entries will be direct matches and will have an associated match count. If the requirement that each match contain at least one subterm directly is not imposed, the output list might be in the form of a match list suitable for further processing. The match count can be used, alone or in combination with importance weighting, to order documents according to relevance.

Turning now to the "ADD" and "SUBTRACT" operations, these are much simpler. For "ADD" operations, the document numbers to be added to a list are simply inserted. Of course, if a direct match is to be added to a list containing an indirect, group match enclosing the document number of he direct match, the group match record is split as described above. For "SUBTRACT" operations, match records are simply deleted from the match list. If a document number is to be subtracted where the document is within a range of a group match record, the group match record is split as described above.

The above description is illustrative and not restrictive. Many variations of the invention will become apparent to those of skill in the art upon review of this disclosure. For example, the hierarchical structure of documents might be a web of documents on the Internet instead of the hierarchical search structure described above. The scope of the invention should, therefore, be determined not with reference to the above description, but instead should be determined with reference to the appended claims along with their full scope of equivalents.

What is claimed is:

1. A method of searching for documents stored in a document repository, wherein documents contain searchable elements and are organized into a document hierarchy, the method comprising the steps of:

providing a search expression to a search engine, wherein the search expression is a logical function describing a set of searchable elements;

searching for direct matches or indirect matches, wherein a direct match is a document which matches the search expression and an indirect match is a document which only matches the search expression when contents of the indirectly matching document are combined with contents of the indirectly matching document's ancestor documents in the hierarchy;

generating a list of at least one match from the results of the step of searching, where a match over multiple documents is expressed as a path in the hierarchy which links the multiple documents; and outputting the list as a search result.

2. The method of claim 1, wherein the searchable elements are words and documents and comprise at least some text.

3. The method of claim 1, wherein the step of searching comprises a step of searching for components of the search expression in an element index.

4. The method of claim 1, further comprising a step of assigning a document number to each document in a hierarchical tree such that the document numbers within any branch of the hierarchical tree are consecutive.

5. The method of claim 1, wherein the search expression is a formula comprising operands and operators, wherein the operands comprise specified searchable elements or wild cards and wherein the operators comprise AND, OR, ADD or MINUS.

6. The method of claim 1, wherein a document is a string representing a specific topic and the hierarchy is a hierarchy of topics.

7. A method of efficiently storing and searching hierarchical data, comprising the steps of:

organizing data elements into a hierarchy, wherein each data element has a position in the hierarchy and has ancestor data elements above the position or descendant data elements below the position or both;

assigning a data element number to each data element such that the data element number of a data element is greater than a data element number of any ancestor data element and is less than a data element number of any other data element which is not a descendant of the ancestor data element and has a data element number greater than the ancestor data element number; and applying a search expression to the hierarchy to identify data elements which match the search expression either directly or indirectly, wherein the search expression is matched directly when content of the data element alone matches the search expression and is matched indirectly when the data element does not match directly, but the content of the data element and at least one ancestor data element together match the search expression.

* * * * *